US005434009A

United States Patent [19]

Urbanek

[11] Patent Number: 5,434,009
[45] Date of Patent: Jul. 18, 1995

[54] AN ACRYLIC BASED COMPOSITION/ASPHALTIC ROOFING LAMINATE

[75] Inventor: Thomas W. Urbanek, Calgary, Canada

[73] Assignee: Polymer Science Corporation, Calgary, Canada

[21] Appl. No.: 33,765

[22] Filed: Mar. 18, 1993

[51] Int. Cl.$^6$ .......................... E04B 7/00; B32B 33/00; B32B 27/08; B32B 11/00

[52] U.S. Cl. ................................. 428/489; 52/309.1; 52/408; 428/141; 428/143; 428/147; 428/148; 428/332; 428/500; 428/515; 428/539.5

[58] Field of Search ............... 428/142, 141, 144, 147, 428/148, 143, 332, 341, 489, 500, 539.5, 515, 402; 52/309.1, 408, 409, 410, 411, 746; 526/329.2

[56] References Cited

U.S. PATENT DOCUMENTS

| | | |
|---|---|---|
| 3,763,605 | 10/1973 | Freeman .................................. 52/58 |
| 4,274,238 | 6/1981 | O'Riordain ............................ 52/408 |
| 4,291,086 | 9/1981 | Auten .................................. 428/242 |
| 4,315,392 | 2/1982 | Sylvest .................................. 52/309.1 |
| 4,351,138 | 9/1982 | McMilan et al. .................... 52/309.4 |
| 4,571,415 | 2/1986 | Jordan, Jr. ............................ 524/428 |
| 4,712,348 | 12/1987 | Triplett et al. .......................... 52/408 |
| 4,712,349 | 12/1987 | Riley et al. ............................ 52/408 |
| 4,749,731 | 6/1988 | Kyminas et al. ....................... 524/31 |
| 4,814,373 | 3/1989 | Frankel et al. ........................ 524/460 |
| 4,870,796 | 10/1989 | Hart et al. ............................. 52/409 |

OTHER PUBLICATIONS

Neste Thermo Product Brochure, Thermolastic TRS (Cold Process Roofing System RT401 12/92–3M, 2 pages, date printed not known.
Rubberflex Waterproofing System Specification, 2 pages, printed Aug. 1990.
Cerami-Coat Product Brochure, Fluid Applied Roofing Systems, 2 pages, date printed not known.
Thermo Materials Incorporated Product Brochure, Thermolastic (Cold Process) Roofing System TRS, 4 pages, date printed not known.
United Coatings Product Brochure, United 600 Non--Bleed 100% Acrylic Elastomer Coating, 2 pages, date printed not known.
Kokem Sunguard Preserves and Protects the Roof Over Year Head, Produce Brochure, 3 pages, dated printed not known.
Monsey Products Co., Reflective Roof Coatings, 1 page, printed Jan. 1992.
National Coatings Corporation, Recommended Application Procedure for Acryshield Elastomeric Roof Coating Over Modified Bitumen, 2 pages, revised Jun. 1990.
Lockheed Focuses His World-Class Technology on Your Roof, 8 pages, printed Sep. 1, 1992.
Acronal 295D, Technical Information, BASF Aktiengessellschaft, 4 pages, printed Feb. 1991.
Acronal S304 Technical Information, BASF Corporation, 4 pages, printed Dec. 1992.
Rohm and Haas Company, EC Technology for Elastomeric Roof Coatings, Rhoplex #C-1791 100% Acrylic, 1989, 18 pages.
Acronal S725 Technical Information, BASF, 3 pages, printed Oct. 1989.

*Primary Examiner*—Paul J. Thibodeau
*Assistant Examiner*—Stephen Sand
*Attorney, Agent, or Firm*—Christensen, O'Connor, Johnson and Kindness

[57] ABSTRACT

A new roofing composition provides for the application of an acrylic polymer to a hot or cold asphaltic layer. The acrylic polymer is provided with barrier characteristics that resist the movement of mobile phases into the shield layer. The barrier characteristics are provided by ensuring that the polymer include a minor (preferably less than 5%) amount of metal complexes. The polymer should be present in an amount sufficient to ensure that it can form a continuous film on application to the base asphaltic layer. Pigment volume concentration should not be present in an amount that would interfere with the barrier characteristics, with the pigment volume concentration being less than 35%.

8 Claims, No Drawings

AN ACRYLIC BASED COMPOSITION/ASPHALTIC ROOFING LAMINATE

FIELD OF THE INVENTION

This invention relates to roofing compositions and their method of application, and in particular relates to asphalt based roofing systems with polymer coatings.

BACKGROUND AND SUMMARY OF THE INVENTION

The most important characteristic of a roofing composition for application to a building is its ability to prevent water from entering the building. Of secondary importance, the roofing composition should also be insulating in cool weather and heat reflecting in hot weather.

While there are other desirable characteristics that a roofing composition may have, for example, durability, the need for a good long lasting waterproofing composition, having resistance to ponding water and delamination, is of greatest importance. A commonly used material for providing waterproofing for roofs is asphalt of various kinds. The asphalt is applied to the roof as a base layer. If left unprotected, however, the asphalt degrades under ultraviolet light radiation, resulting in delamination and cracking. It has, therefore, long been recognized that it is necessary to protect base asphaltic roofing layers from ultraviolet light.

One method of supplying ultraviolet light blocking is to cover the base asphaltic layer with gravel. This is effective but the resulting roof is very heavy and prone to leakage. Another method is to cover the asphalt with an acrylic polymer based coating or layer. While the acrylic polymer can provide some ultraviolet light blocking, it has been found that it is necessary in practice to add an ultraviolet light blocking filler to the acrylic polymer to provide an adequate ultraviolet light blocking effect and to reduce cost.

One difficulty with some acrylic polymer based coatings, however, is that they have poor barrier characteristics when applied as a wet coating to a hot or cold base asphaltic layer. For this reason, mobile phases, such as oils, in the base asphaltic layer, can migrate into the acrylic polymer coating and cause discolouration, with resulting undesirable heating of the roofing material and interference with its desirable characteristics, such as adhesion to the base asphaltic layer, resistance to ponding water and ultraviolet light blocking. This problem exists for hot or cold applied base asphaltic layers, whether the asphalt is applied in melted form or as a dispersion in water, since the oil phases in both cases have high mobility. Thus, it is now common for acrylic shields to be applied only when the base asphaltic layer has cooled and weathered, perhaps as long as six weeks after initial application. This makes the roofing of the building more time consuming and expensive.

The inventor has provided a new roofing composition that in particular provides for the application of an acrylic polymer to a hot or recently applied cold asphaltic layer. The acrylic polymer is provided with barrier characteristics that resist the movement of mobile phases into the shield layer. The barrier characteristics are provided in one embodiment of the invention by ensuring that the polymer include a minor (preferably less than 5%) amount of metal complexes. The polymer should be present in an amount sufficient to ensure that it can form a continuous film on application to the base asphaltic layer. Pigment volume concentration should not exceed the level that would interfere with the barrier characteristics, with the pigment volume concentration being less than 35%.

These and further characteristics of the invention are described in more detail in the description and claims that follow.

DETAILED DESCRIPTION OF PREFERRED EMBODIMENTS

Hard polymer for the purposes of this patent document means a polymer having a glass transition temperature greater than about 5° C. Soft polymer means a polymer having a glass transition temperature less than −10° C. A metal complex is a combination of polymers or co-polymers with functional groups acting as Lewis bases and metal compounds providing cross-linking between the polymers. The metal complexes may be formed of polyvalent metallic compounds such as hydrated zinc oxide and a group having carboxylic functions attached to the polymer. Exemplary carboxylic groups may be introduced to the polymer via the following monomers: acrylic acid, methacrylic acid and itaconic acid. Exemplary polyvalent metallic compounds include aluminum salts, iron salts, chromium salts, zirconium salts, calcium salts, barium salts and magnesium salts.

The roofing composition of the invention is intended for application to asphalt roofs. The asphalt forms a base asphaltic layer. The base asphaltic layer is conventional and any of various asphalts may be used, for example the modified asphalt sold as no. 6125 by American Hydrotech Inc.

In a preferred implementation of the invention, a single layer including an acrylic polymer (or co-polymer) is applied in known manner such as by a squeegee to the base asphaltic layer. The acrylic polymer should be present in an amount sufficient to form a continuous film upon application to the base asphaltic layer. A styrene acrylic co-polymer is preferred. The application may be carried out while the freshly applied (modified) asphalt is hot (melted) or after the (modified) asphalt applied as a dispersion has skinned over sufficiently to form a base for the next layer to be applied to. The single layer should have barrier characteristics to mobile (oily) phases in the hot or cold applied asphalt. Mobile phase blocking characteristics are believed to be provided by the presence of the metal complexes within the acrylic polymer. The metal complexes should be present in an amount preferably less than 5%, and greater than about 0.5%, at least sufficient to promote and form cross-linking between the polymer molecules. The cross-linking and presence of the metallic complexes is believed to provide the mobile phase blocking characteristics.

The amount of polymer required to form a continuous film upon application to the base asphaltic layer is related to the pigment volume concentration (PVC). PVC is the ratio of the pigment volume to total volume of the composition. Pigment volume is taken to include pigment and other fillers or extenders. If the Pvc level is too high, then the polymer will not be able to form a continuous film. Evidently, there must be sufficient composition to actually cover the surface of the base asphaltic layer, the emphasis here is on the amount of pigment and filler that might be present in the composition that might interfere with the barrier forming properties of the composition. Pigment volume may be calculated by dividing the mass of the pigment by its specific gravity. Likewise, the volume of the composition may be calculated by dividing its dry mass by its specific gravity. A composition having greater than 35% PVC is believed to begin to interfere with the continuity of the film and more than 45% PVC is believed to interfere with the continuity of the film to such an extent that the barrier properties of the film are lost.

The single layer should also have ultraviolet light blocking characteristics. Acrylic polymer resin has ultraviolet light blocking characteristics, but this should be supplemented by other ultraviolet light blocking agents such as titanium oxide. It will be understood that the acrylic polymer should be at least sufficiently flexible to accommodate flexing of the underlying asphalt at a broad temperature range. The provision of such a polymer having the desired flexibility characteristics is, in general, within the skill of a person skilled in the art. If the flexible acrylic polymer includes a sufficient amount of metal complexes in accordance with the teachings of this invention then the desired combination of barrier characteristics and flexibility may be obtained. The inventor, however, prefers to use a co-polymer formed of a dispersion of a hard polymer and a soft polymer. The hard polymer is preferably Acronal TM S725 available from BASF in Ludwigshafen in Germany. The soft polymer is preferably Acronal TM S304 also available from BASF. Acronal TM S725 is an aqueous anionic dispersion of a butyl acrylate/styrene co-polymer having a solids mass fraction of 45±1%, a pH of from 8.5 to 10, a viscosity at 23° C. of from 25 to 60 mPa.s, a minimum film-forming temperature of approximately 8° C., an average particle diameter of approximately 0.1 μm, a sensitivity to frost at less than 0° C., and that forms a film upon application having a density of 1.09 g/cm³ and exhibits approximately 9% water absorption after 24 hours' immersion. Acronal TM S304 is an aqueous, anionic dispersion of an acrylic acid ester-styrene co-polymer having a pH of from 7.5 to 9.5, a viscosity at 23° C. of from 30 to 150 mPa.s, an apparent viscosity at 23° C. of approximately 250 mPa.s, a minimum film-forming temperature of less than approximately 1° C., is free from plasticizer, is sensitive to frost below 0° C., and that forms a film upon application that has a density of approximately 1.1 g/cm³, a glass transition temperature of approximately −22° C., exhibits approximately 15% water absorption after 48 hours' immersion, and exhibits a mechanical strength characterized by approximately from 800 to 1400% elongation at at 23° C. and approximately 80 to 130% elongation at break at −20° C. The ratio of hard polymer to soft polymer is preferably between 9:1 and 1:9. A 9:1 ration has superior barrier characteristics but because of a lack of flexibility, it is not suitable for use in areas with large annual temperatures variations such as much of Canada and northern United States. The brittle characteristics of the 9:1 ratio makes the product more difficult to apply. If the film is too thick, it may too readily crack. In addition, ratios of less than 1:1 while having good flexibility, provide less desirable barrier characteristics. A 1:1 ratio is desirable for its flexibility and ease of application. It will be appreciated that the presence of metal complexes (0.5 to 5%) in the hard polymer provide the desirable barrier characteristics, and at the same time result in the polymer being hard, so that in general it is believed that the selection of an appropriate hard polymer and an appropriate soft polymer will result in the desirable combination of flexibility and mobile phase blocking.

While the acrylic polymers together with the cross-linking promoting metal complexes provide suitable characteristics for a barrier and shield layer for a base asphaltic layer, it will be appreciated that in the general case, pigment and filler are preferably added to the polymer. The pigment is used to ensure an appropriate colour, assist in blocking ultraviolet light, and reflect heat. The filler, for example finely ground calcium carbonate or sodium potassium aluminum silicate (10-60% range is preferred), is used for a variety of reasons, such as cost reduction, ultraviolet light blocking and tensile elongation. The pigment volume concentration should not be so high as to interfere with the continuity of the acrylic polymer film forming the barrier layer and therefore the barrier properties of the polymer. It is believed that pigment volume concentration of 35% or lower will avoid interference with barrier properties.

In accordance with known practice, the barrier and shield layer preferably includes a biocide in small quantities about 0.07%, dispersing agent in small quantities about 0.1% (for example, Dispex A TM available from Allied Colorids), coalescing agent 0-2% (if desired, for example Texanol TM available from Eastman Kodak, Tennessee), defoamer 0-1% (for example, BYK035 TM available from BYK-Chemie, Connecticut), thickener 1-5% (for example, Acrysol SCT275 TM available from Rohm & Haas, Ontario, Canada) and aramid fibres 0-2% for strength.

The base asphaltic layer may be re-enforced by partially embedding a flexible mesh in the base asphaltic layer. A polyester or glass fibre mesh may be used, and it should have similar flexibility to the base asphaltic layer.

Alternatively, the barrier and shield layer may be formed of two separately applied layers. The barrier layer, which is fully adhered to the base asphaltic layer, is formed of a dispersion of a hard acrylic polymer and a soft acrylic polymer in water, the hard acrylic polymer having a glass transition temperature greater than 5° C., such as Acronal TM S295 (available from BASF) and the soft acrylic polymer having a glass transition temperature lower than −10° C., such as Acronal TM S304 TM, the hard acrylic polymer present in an amount sufficient to form a continuous film upon application to the base asphaltic layer. In one embodiment, the Acronal TM S295 and Acronal TM S304 are both present in the amount of 32% by weight, with 19.2% calcium carbonate. A shield layer is then applied to and adhered to the barrier layer. The shield layer should have good flexibility, good adhesion properties to the barrier layer and be ultraviolet light blocking. The flexibility may be obtained from a suitable soft polymer such as Acronal TM S304, and the ultraviolet light blocking by appropriate selection of filler or other additives, the selection of which is known in the art.

The preferred composition of the single layer (combined barrier and shield) is as follows (all percentages in the tables are by mass percentage):

| Component | Percentage |
| --- | --- |
| Water | 2.928 |
| Calcium Carbonate | 33.615 |
| Titanium dioxide | 1.769 |
| Texanol TM | 1.525 |

-continued

| Component | Percentage |
| --- | --- |
| BYK035 TM | 0.508 |
| Acronal TM S304 | 29.233 |
| Acronal TM S725 | 29.233 |
| Acrysol TM SCT275 (0.51%) + glycol | 1.16 |
| Aramid Fibres | 0.53 |
| Dispersing agent | 0.102 |
| Biocide | 0.071 |

This composition has been applied as a single coating in the amount of 1 liter/square meter to a freshly applied hot base asphaltic layer of modified asphalt no. 6125 by American Hydrotech Inc. and has resisted ponding for 5 months at a 20° C. The Acronal TM S725 is understood to have between 0.5% and 5% hydrated zinc oxide. The PVC for this composition is 32%.

The composition of a barrier layer that the inventor has used in conjunction with the shield layer is as follows (although it should be noted that the single barrier and shield layer is preferred):

| Component | Percentage |
| --- | --- |
| Water | 14.498 |
| Calcium Carbonate | 19.161 |
| BYK035 TM | 0.5 |
| Acronal TM S304 | 31.93 |
| Acronal TM S725 | 31.93 |
| Acrysol TM SCT275 + glycol | 1.42 |
| Biocide | 0.07 |

The PVC of the barrier layer is 32%.

The preferred composition of the shield layer is as follows:

| Component | Percentage |
| --- | --- |
| Water | 0 |
| Sodium Potassium Aluminum Silicate | 39.062 |
| Titanium dioxide | 2.055 |
| Texanol TM | 0.50 |
| BYK035 TM | 0.50 |
| Acronal TM S304 | 56.715 |
| Acronal TM S725 | 0.0 |
| Acrysol TM SCT275 + glycol | 1.10 |
| Aramid Fibres | 0.53 |
| Biocide | 0.07 |

PVC for the shield is 35%. It should be noted that the shield layer lacks the barrier properties and if barrier properties are desired, the shield should be used in conjunction with a barrier layer. The shield layer may be applied to the barrier layer or to the single combined shield and barrier layer, or to other material such as metal or wood as a flexible ultraviolet shield layer. The barrier layer has been applied to freshly applied hot and cold base asphaltic layers and has shown excellent adhesion to the base asphaltic layer, resistance to ponding water and ultraviolet light blocking. The shield layer demonstrates excellent ultraviolet light blocking characteristics along with high flexibility and adhesion to the barrier layer.

In the method of the invention, the application is carried out by first hot or cold applying a base asphaltic layer to the roof in known manner. Even while the base asphaltic layer remains hot, the next step is immediately applying an ultraviolet light shield layer to the base asphaltic layer, the ultraviolet light shield layer having mobile phase blocking characteristics. Immediately in this context means within a few hours or days, while the asphalt remains unweathered, that is, black and shiny. The ultraviolet light shield layer can be applied to the base asphaltic layer as a single layer including an acrylic polymer in an amount sufficient to form a continuous film upon application to the base asphaltic layer and a cross-linking promoting metal complex within the acrylic polymer. Alternatively, the ultraviolet shield layer can be applied in two layers, firstly, by applying a barrier layer to the base asphaltic layer, the barrier layer including a dispersion of a hard acrylic polymer (such as Acronal TM S295) and a soft acrylic polymer (such as Acronal TM S304) in water, with the hard acrylic polymer present in an amount sufficient to form a continuous film upon application to the base asphaltic layer; and secondly, by applying a shield layer to the barrier layer, the shield layer including an ultraviolet light blocking agent as described above. Optionally, a flexible fabric may be partially embedded in the base asphaltic layer before applying the shield layer. Typical application amounts, to achieve adequate coverage, for the barrier layer are in the order of 0.33 liters/square meter, for the shield layer 0.66 liter/square meter and for the single coat 1 liter/square meter.

A person skilled in the art could make immaterial modifications to the invention described and claimed in this patent without departing from the essence of the invention.

The embodiments of the invention in which an exclusive property or privilege is claimed are defined as follows:

1. A roofing laminate comprising:
    a first layer forming an asphaltic base for the laminate; and
    at least a second layer adhered to the first layer, the second layer including an acrylic polymer in an amount sufficient to form a continuous film upon application to the base asphaltic layer and a cross-linking promoting metal complex within the acrylic polymer; and
    the second layer being formed from a mixture of a first acrylic polymer having a glass transition temperature greater than 5° C. and a second acrylic polymer having a glass transition temperature lower than −10° C. in a ratio between 9:1 and 1:9.

2. The roofing laminate of claim 1 in which the first acrylic polymer is an aqueous dispersion of a butyl acrylate/Styrene co-polymer and the second acrylic polymer is an aqueous dispersion of an acrylic acid ester-styrene co-polymer.

3. The roofing laminate of claim 2 in which the ratio of the amount of the first acrylic polymer to the second acrylic polymer is about 1:1.

4. The roofing laminate of claim 1, further including pigment and filler in the second layer, and in which the ratio of the pigment volume to total volume of the second layer is less than 35%.

5. The roofing laminate of claim 1 further comprising:
    a third layer adhered to the second layer, the third layer being formed of acrylic polymer having a glass transition temperature lower than −10° C. and including an ultraviolet light blocking agent.

6. The roofing laminate of claim 5 in which the first acrylic polymer and the second acrylic polymer are present in approximately equal quantities in the second layer.

7. The roofing laminate of claim 2, wherein the first acrylic polymer is an anionic dispersion having a solids mass fraction of 45±1%, a pH of from 8.5 to 10, a viscosity at 23° C. of from 25 to 60 mPa.s, a minimum film-forming temperature of approximately 8° C., an average particle diameter of approximately 0.1 μm, a sensitivity to frost at less than 0° C., and that forms a film upon application having a density of 1.09 g/cm$^3$ and exhibits approximately 9% water absorption after 24 hours' immersion; and the second acrylic polymer is an anionic dispersion having a solids content of 50±1%, a pH of from 7.5 to 9.5, a viscosity at 23° C. of from 30 to 150 mPa.s, an apparent viscosity at 23° C. approximately 250, mPa.s a minimum film-forming temperature of less than approximately 1° C., is free from plasticizer, is sensitive to frost below 0° C., and that forms a film upon application that has a density of approximately 1.1 g/cm$^3$, a glass transition temperature of approximately −22° C., exhibits approximately 15% water absorption after 48 hours' immersion, and exhibits a mechanical strength characterized by approximately from 800 to 1400% elongation at break at 23° C. and approximately 80 to 130% elongation at break at −20° C.

8. The roofing laminate of claim 7, wherein the first acrylic polymer includes from 0.5 to 5% by weight of said cross-linking promoting metal complexes.

* * * * *